INVENTORS
WILLIAM A. ALSTEDT
WAYNE G. ATWATER
BY
Baldwin, Dorant Ega
ATTORNEYS

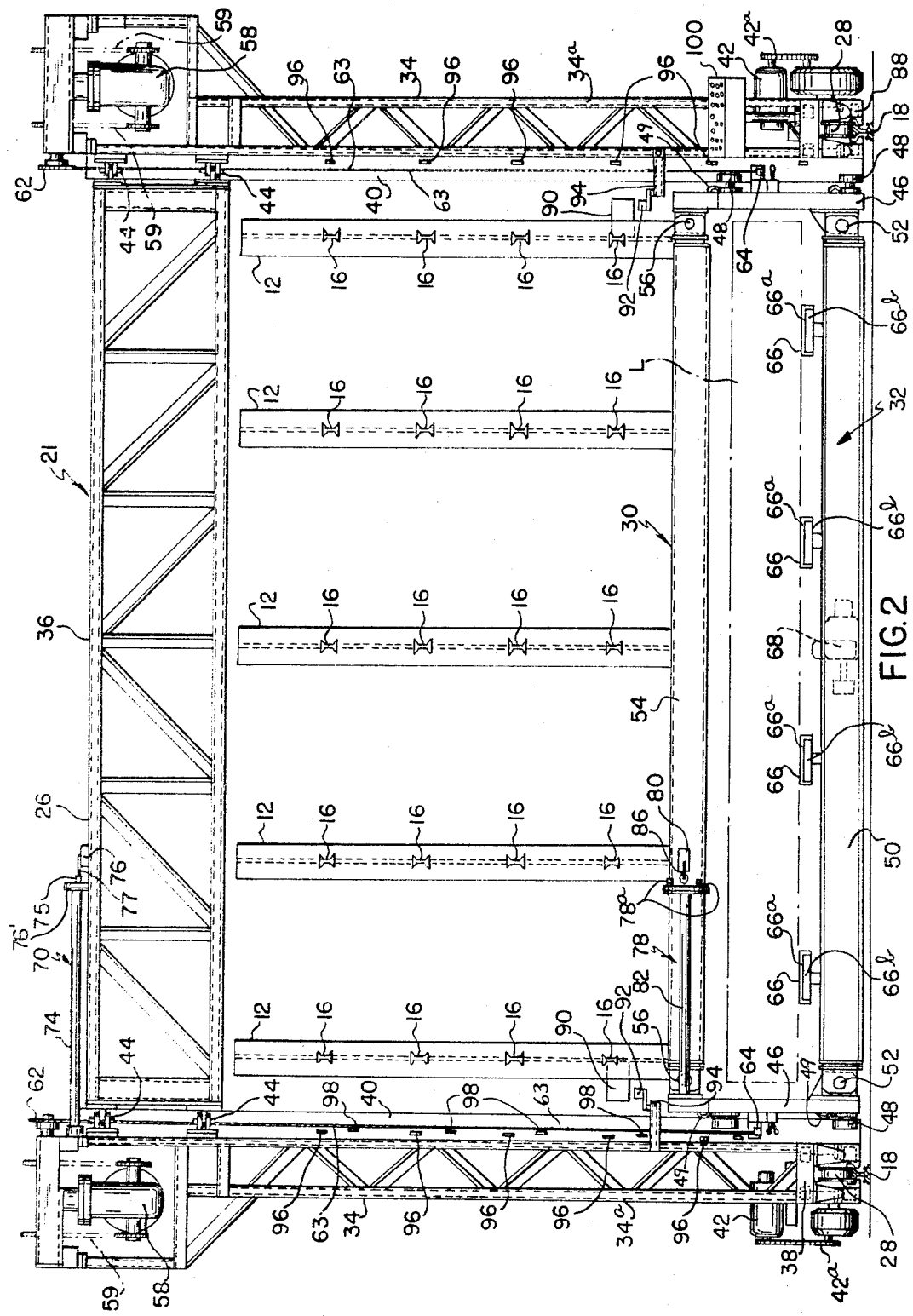

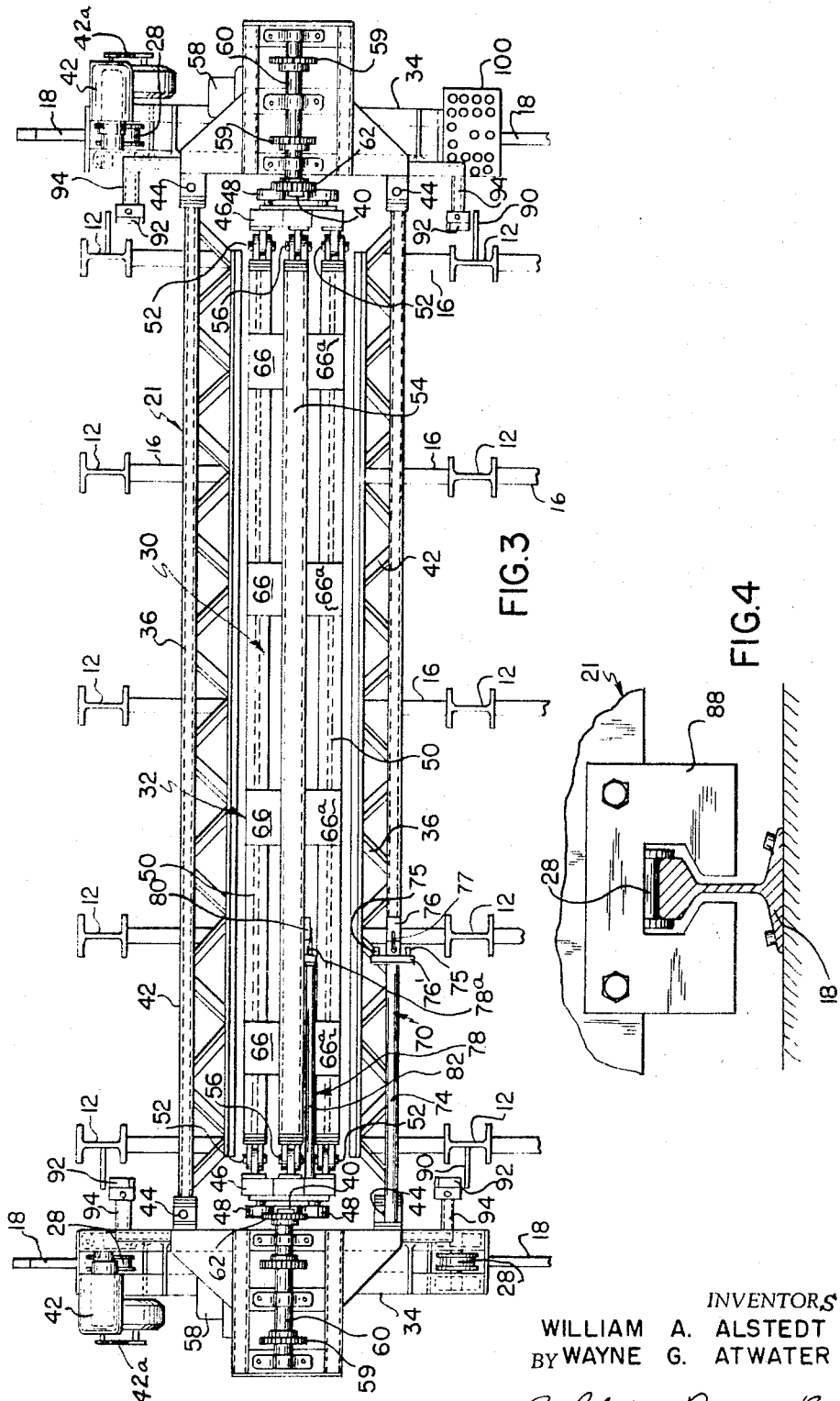

United States Patent Office 3,445,010
Patented May 20, 1969

3,445,010
AUTOMATIC WAREHOUSING SYSTEM
FOR BAR STORAGE
William A. Alstedt, Cleveland, and Wayne G. Atwater,
Willoughby, Ohio, assignor to The Triax Company,
Cleveland, Ohio, a corporation of Ohio
Filed July 10, 1967, Ser. No. 652,102
Int. Cl. E04h 6/00; B66c 5/02, 19/00
U.S. Cl. 214—16.4                                    14 Claims

ABSTRACT OF THE DISCLOSURE

The automatic warehousing system comprises a storage frame for storing long loads, such as elongated bars, tubes, pipes, structural elements or the like, and a load transfer or load carrier mechanism for picking up an elongated load from a starting position and moving it above the storage frame and then down into the storage frame, or for removing a load from the storage frame to a position above the storage frame and then back to a position exteriorly of the storage frame. The storage frame may comprise laterally spaced upright load columns with vertically spaced laterally-extending load supports thereon, adapted to receive the elongated load or loads thereon. A plurality of rows of load columns may be provided defining travel zones or aisles between the rows. The load carrier comprises a gantry-like conveyor frame supported for movement on rails at floor level, with the gantry-like conveyor frame straddling the storage frame during insertion or removal of a load into or from the storage frame. An elongated elevator is supported for vertical movement on the gantry-like frame with an extractor mechanism mounted on the elevator and adapted for lateral movement with respect thereto for moving loads onto and from the laterally-extending load supports of the storage frame. The elevator and associated extractor mechanism are adapted to be positioned adjacent the upper end of the gantry-like conveyor frame during movement of the latter along the storage frame thus providing for passage of the elevator and extractor above the storage frame during movement of the conveyor frame along the storage frame. The extractor is adapted to pick up a load at a pick up and delivery station at one end of the storage frame with the elevator and associated extractor then moving the load vertically on the conveyor frame above the storage frame. Then the conveyor frame moves into the storage frame with the load supported in raised elevation above the storage frame until arrival of the conveyor frame at the desired aisle in the storage frame. The elevator then lowers the load vertically down to the desired level in the aisle and the extractor mechanism deposits the load into the storage frame at the selected level. To remove a load from the storage frame for return to the pickup and delivery station the reverse operation occurs. The vertical and transverse components of the gantry-like conveyor frame are pivoted together and the vertical components are powered for synchronized movement, for obtaining self alignment of the conveyor frame, and the vertical and transverse components of the elevator are likewise pivoted together for obtaining self alignment thereof. Limit switch means are provided for limiting misalignment between the pivoted components of the gantry-like conveyor frame and the components of the elevator.

This invention relates in general to automatic warehousing systems and more particularly to an automatic warehousing system including a storage frame and a load transfer mechanism movable with respect to the storage frame for handling and storing long loads, such as elongated bars, pipes or the like.

Long loads such as, for instance, bars, pipe, structural components and the like are relatively difficult to store in a compact and readily-accessible manner. Overhead type stacker cranes in conjunction with a storage frame are presently often utilized to store such components, but such stacker cranes need considerable space above the storage frame for movement of the crane. Generally they also need aisles of considerable width between the storage frame sections for movement of the stacker crane and associated load along the aisle, and usually need a relatively large area for handling the load in preparation for movement of the load by the overhead stacker crane into the storage area. An example of an overhead stacker crane for storing elongated loads is disclosed in U.S. Patent No. 3,268,097, issued Aug. 23, 1966, in the name of Stewart F. Armington, Jr. et al.

The present invention provides a novel load transfer and storage mechanism for storing elongated loads wherein the load transfer mechanism or load carrier for moving the loads into and from the storage frame comprises in the embodiment illustrated a gantry-like conveyor frame which is adapted to straddle the storage frame and is movable with respect to the storage frame, and with an elongated elevator being mounted on the gantry-like frame for vertical movement with respect thereto and being movable to a higher level than the height of the storage frame, and with the elevator having an extractor mechanism mounted thereon adapted to pick up a load from a pick-up and discharge station disposed exteriorly of the storage area whereupon the elevator moves the load vertically upwardly to a level above the storage frame, and then the gantry-like frame moves down into the storage area to the selected aisle after which the elevator lowers or moves vertically downwardly into the aisle and the extractor on the elevator then deposits a load at the selected level in the storage frame. The reverse operation occurs during removal of a load from the storage area. Such an arrangement provides a highly compact storage and load handling mechanism and one that is efficiently operable and effective in a safe manner for handling and storing long loads, such as those aforedescribed.

Accordingly an object of the invention is to provide a novel load handling and storage apparatus.

Another object of the invention is to provide a novel load handling and storage apparatus comprising a storage frame having spaced columns with load supporting means extending outwardly therefrom and a load carrier mechanism movable with respect to the storage frame for inserting a load into or withdrawing a load from the storage frame, and with the load carrier mechanism comprising a gantry-like conveyor frame adapted to move into straddled relationship with respect to the storage frame and having a vertically movable elevator and a laterally movable extractor mechanism mounted on the elevator for picking up a load from a position exteriorly of the storage frame, lifting the load vertically to a level above the storage frame and then moving down into the storage frame area, and then moving the elevator and load supporting extractor vertically downwardly to the selected level in the storage frame for inserting a load into the storage frame, or vice versa for removing a load from the storage frame.

Another object of the invention is to provide a load handling and storage apparatus of the above-described type wherein the gantry-like conveyor frame comprises generally vertically extending side frame components mounted on track means for movement of the conveyor frame, and transversely extending cross components connecting the vertically extending side frame components, and with such transversely extending cross components and vertically extending side frame components being pivotally coupled to one another, and with each of the side frame components being independently driven by power means driving the side frame components in synchronism for maintaining alignment of the gantry-like conveyor frame components.

A further object of the invention is to provide a load handling and storing apparatus of the above-described type wherein said elevator is of elongated configuration supported for guided vertical movement on said gantry-like conveyor frame and with the elevator comprising side components and transversely extending cross components which are pivotally coupled to one another for relative movement in vertical directions, and with separate power means operating in synchronism coacting with each side component of the elevator, for moving the latter vertically on the conveyor frame.

A further object of the invention is to provide a load handling and storage apparatus of the latter-mentioned type including means for sensing whether or not said gantry-like conveyor frame is in transverse alignment and whether said elevator is in vertical alignment, and for causing re-alignment of the components of the latter when necessary.

A still further object of the invention is to provide a load handling and storage apparatus of the above general type wherein the side frame components of said gantry-like conveyor frame are of truss construction, with vertically extending tracks mounted thereon, and with said elevator having wheel means coacting with the vertical tracks and guiding the vertical movement of the elevator, with the elevator being adapted to be received in nested relation between the transversely extending cross components of the conveyor frame in the upper portion of the latter during movement of the conveyor frame in the storage frame area.

A further object of the invention is to provide a load handling and storage apparatus in accordance with the above wherein the extractor comprises spaced, telescopic, extensible load support members mounted on said elevator for supporting an elongated load and moving the latter laterally into and from the outwardly extending support elements of the storage frame.

Other objects and advantages of the invention will be apparent from the following description taken in conjunction with the accompanying drawings wherein:

FIGURE 1 is a side elevational, generally diagrammatic illustration of a load handling and storage apparatus constructed in accordance with the present invention, and showing at one end of the storage frame a pick-up and discharge station whereat a load is adapted for being picked up by the movable load carier mechanism or adapted to be deposited after being removed from the storage frame by the load carrier mechanism; in phantom lines there is also shown two positions of the elevator and associated extractor of the load carrier mechanism, one position being an elevated position where a load is normally carried at a level above the storage frame during movement of the load carrier to the selected aisle of the storage frame, and the other a lowered position of the elevator in the selected aisle;

FIGURE 2 is an end elevational view of the load carrier taken generally along the plane of line 2—2 of FIGURE 1 looking in the direction of the arrows, and showing in particular, the structural arrangement of both the gantry-like conveyor frame and the elevator, and showing the pivotal connections of the various components of such members; in dot-dash lines there is shown an elongated load supported on the extractor mechanism which, in turn, is mounted on the elevator;

FIGURE 3 is a top plan view of the FIGURE 2 illustration;

FIGURE 4 is an enlarged fragmentary illustration of a rail safety grab as attached to the conveyor frame, to prevent accidental tipping over of the conveyor frame.

Figure 1:
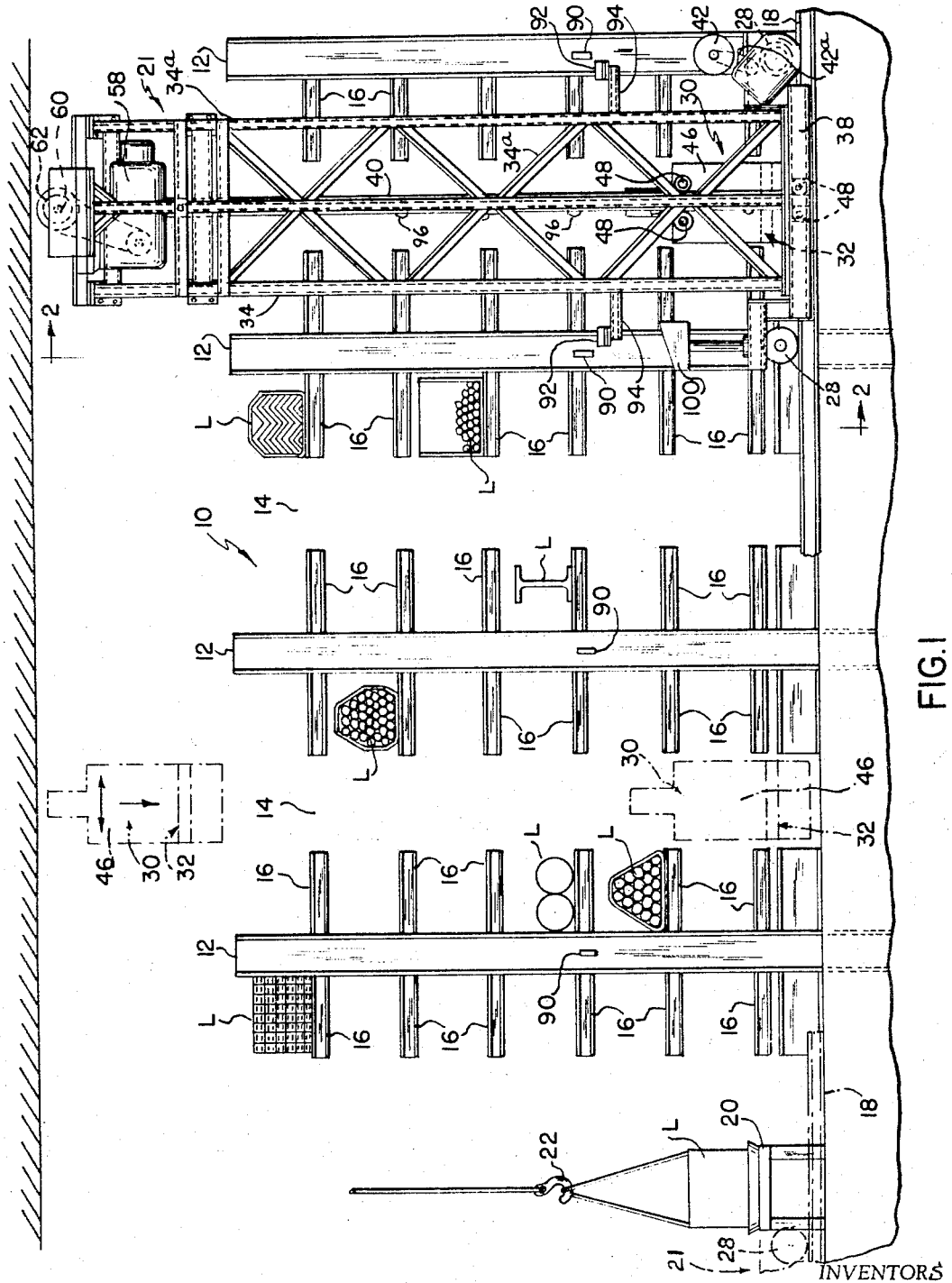

Referring now again to the drawings, the warehousing storage frame structure 10 herein illustrated comprises parallel rows of spaced vertical posts 12 defining between the post rows, aisles or travel zones 14 (FIGURE 1) with each of the posts supporting a plurality of vertically spaced storage load supports 16, which in the embodiment illustrated comprise cantilevered arms extending generally horizontally away from the posts toward the respective aisle. The arms 16 are adapted to support elongated loads L thereon, such as for instance pipe, tubes, structural elements or the like, and as illustrated in FIGURE 1.

Rails 18 may be provided extending along opposite sides of the storage frame 10. Such rails may be depressed into the floor of the warehouse, or may be merely secured to the top of the floor as illustrated. A pick-up and discharge station 20 may be provided at one end of the storage frame area with such pick-up and discharge station comprising in the embodiment illustrated, spaced supports on which an elongated load L may be deposited so as to elevate the load above ground level. Supports 20 are preferably disposed inwardly of rails 18 and out of interfering relation with the load carrier 21. The load L may be readily deposited on the pick-up and discharge station 20 as by means of an overhead cable and which (not shown) including in the embodiment illustrated a hook 22, so that loads may be readily positioned at, and removed from, the pick-up and discharge station by the load carrier mechanism 21. As will be understood from FIGURE 1, the elongated load L supported on the spaced pick-up and discharge station supports extends generally parallel to the rows of column supports 12 and transversely of the storage frame. Stations 20 could be provided at both ends of the storage frame area, with, for example, one station being adapted for receiving loads to be stored while the other could be adapted for receiving loads removed from the storage frame.

The load carrier mechanism 21 comprises in the embodiment illustrated a gantry-like conveyor frame 26 (FIGURE 2) which is supported by means of traction mechanism or wheels 28 on the rails 18, with the gantry-like conveyor frame 26 supporting an elongated elevator 30 thereon for vertical movement with respect to the conveyor frame, and with the elevator in turn supporting laterally movable extractor mechanism 32 which is adapted for supporting a load thereon and inserting it into the storage frame, or for removing a load from the storage frame.

The gantry-like conveyor frame 26 comprises, in the embodiment illustrated, generally vertically extending side frame components 34 and transverse cross components 36 connecting the side frame components. Side frame components 34 have the aforementioned wheel means 28 rotatably mounted thereon. Each side frame component 34 may comprise truss structure 34a extending upwardly from the generally U-shaped base section or carriage 38 of the side frame, and generally centrally located track means 40 which in the embodiment illustrated are secured to the inner side of the central upright member of the truss structure 34a, extending vertically upwardly to substantially the uppermost extremity of the conveyor side frame, as best shown in FIGURE 2. Tracks or masts 40 are preferably hollow and open at least at their upper ends, and are adapted for guiding the vertical movement of the elevator 30 as will be hereinafter described in greater detail.

Each of the side frame members 34 is driven by a power means, such as an electric motor 42, suitably coupled as by means of drive 42a, to a wheel of the respective side frame, for moving the respective side frame and thus the gantry-like conveyor frame 26 along the rails 18 of the warehousing system. Motors 42 are synchronized in the conventional manner for maintaining the transverse alignment of the conveyor frame.

The transverse components 36 of the gantry-like conveyor frame are preferably of truss-like construction as illustrated, and comprise a pair of such trusses (FIGURE 3) extending between and tying together the side frame components 34 of the load carrier conveyor 26. Each truss 36 is pinned as at 44 to the associated side frame, thus providing for relative movement in a horizontal plane and resulting in continual alignment of the transverse truss components 36 with respect to the side frame components during the synchronous movement of the side frame components along the rails 18, and as driven by means of the power means 42 for each side frame component.

The aforementioned elevator 30, in the embodiment illustrated, comprises side portions 46, which may have vertically spaced sets of rollers 48, rotatably mounted thereon adapted for rolling coaction with the aforementioned track means 40 on the respective side frame of the conveyor 26, for guiding the vertical movement of the elevator with respect to the conveyor frame. Rollers 49 may be rotatably mounted on the side members 46 of the elevator in confronting relation to the respective track 40 for preventing any tendency of the elevator side components 46 to gouge into the tracks 40. Tying together the side portions 46 of the elevator may be spaced, lower cross member 50 pivoted at each end thereof as at 52, with a horizontal pivot pin, to the respective side member, and upper generally centrally-located cross member 54 adapted to extend above the load L being handled by the elevator mechanism and being pivoted as at 56 to the side portions 46 of the elevator construction. As can be seen, upper cross member 54 is a compression member in the elevator construction.

A power means, such as an electric motor 58 may be mounted on the upper portion of each conveyor side frame component 34, for raising and lowering the elevator with respect to the gantry-like conveyor frame 26. Each motor may be suitably coupled to a gear reduction mechanism, which in turn is suitably coupled, as by means of a chain and sprocket drive means 59 to a shaft 60 rotatably mounted on the head portion of the associated side frame 34 of the conveyor frame, with the shaft having a sprocket 62 secured thereto, coacting with a chain 63 which may pass over the sprocket and be attached at one end to the elevator, as at 64 while the other end extends into the interior of the associated hollow track member 40 and supports a vertically movable weight thereon. Vertical upward and downward movements of the elevator depends upon the direction of rotation of the motors 58, the latter being operated in synchronization, while the hollow tracks 40 guide the upward and downward movement of the weights on chains 63.

Mounted on the lower cross members 50 of the elevator is the afore-mentioned extractor mechanism 32 which is adapted to move laterally of the elevator either with a load supported thereon and deposit it in the storage frame, or to move laterally of the elevator and pick up a load that is already in the storage frame and move it back to the pick-up and discharge station 20. The extractor mechanism in the embodiment illustrated comprises a plurality of spaced load-supporting units 66, with each of such mechanism 66 being of the extensible platform type for supporting a load on the top thereof and then moving the load in unison onto or from the selected of the support arms 16 at the selected level of the storage frame. Extractor units 66 are adapted to be driven in unison by means of a common transversely extending drive shaft extending between the lower cross elements 50 of the elevator and being supported thereby, with such shaft being adapted to be driven by, for instance, an electric motor 68 carried by the elevator. It will be understood that the extractor mechanism 32 is only diagrammatically illustrated and reference may be had to the copending U.S. Patent application, Ser. No. 594,708 entitled Extractor and filed Nov. 16, 1966 in the name of William A. Alstedt, for a detailed disclosure of suitable mechanism for the extractor units 66. Suffice it to say that each of such units 66 may comprise an outer member 66a and an inner member 66b telescopically movable with respect to one another, with means for driving the outer member outwardly from the elevator a greater distance than the inner member, and as disclosed in aforementioned application 594,708.

In order to insure that the side frame components 34 of the conveyor frame are maintained in general alignment during movement of the load carrier along the rails 18, there may be provided a squaring control means 70 (FIGURES 2 and 3) so that in the event that drive motors 42 for each of the side frames happens to get out of synchronization with the other motor, and thus one side frame starts to lead or lag the other, creating a parallelogram condition between the transverse cross components 36 and the side frame components 34, the squaring control 70 will be actuated so that the fast drive motor for the conveyor side frames will be either decelerated or stopped. Such squaring control comprises in the embodiment illustrated a support such as a rod 74 fixed to one of the side frame components 34 generally adjacent the pivotal connection of one of the transverse components 36 to the associated side frame, and extending outwardly therefrom, with horizontally spaced trips 75 (FIGURE 3) being preferably adjustably mounted on an end plate 76' secured to the rod 74. A conventional, neutral position switch 76 may be mounted on the adjacent cross component 36 with the spring-loaded actuator 77 of the switch disposed intermediate the actuating lugs 75 of the squaring control. It will be seen, therefore, that if drive motors 42 for the side frame components of the conveyor frame 26 get out of synchronization, one side of the parallelogram effect of the transverse cross components 36 mounting the switch 76 thereon will cause engagement of the actuator 77 of the switch with one or the other of the actuating lugs on the squaring control. Actuation of the switch which is coupled into the motor control circuitry will be operative to decelerate the fast motor or to completely stop both motors so that synchronization of the motors can be reestablished.

Likewise, the elevator 30 is preferably provided with a squaring control 70, except that the preferably adjustable actuating lugs 78a on the squaring control 78 are vertically spaced with respect to one another and the control switch 80 is mounted on the cross member 54 of the elevator, while the rod or support 82 of the squaring control assembly is secured to one of the side members 46 of the elevator. Thus if the motors 58 driving the elevator get out of synchronization, the elevator structure will create a parallelogram condition (due to its pivotal construction) thereby causing actuation of the spring-loaded actuator 86 of the switch 80, to cause either deceleration of the fast motor of the elevator motors 58 or stopping of the motors, so that synchronization of the motors 58 can be reestablished.

In the event that the lift chain 63 on one side of the gantry conveyor frame should fail, the vertical carriage will of course move into a parallelogram condition which actually shortens the length of the carriage, thus eliminating the possibility of damage from forced binding of the elevator against the end frame components of the conveyor frame.

Rail safety grabs 88 (FIGURES 2 and 4) may be provided in association with each of the wheels 28 of the conveyor frame, to prevent the conveyor frame from tipping over in the event of a sudden or emergency stop of the load carrier as it moves along rails 18. Each grab 88 may comprise a flat plate secured to the respective side frame component adjacent the associated wheel and generally encompassing the head of the associated rail 18.

The movements of the conveyor frame 26 and elevator 30 and extractor mechanism 32 of the load carrier 21 are all preferably automatically actuated in a predetermined series of movements as will be hereinafter described in detail, to store or to retrieve a load, and as by means of an automatic control system of the general type disclosed in the copending United States Patent Application of Sanford Saul, filed Dec. 14, 1964 under Ser. No. 418,048 and entitled Electrical Control Circuit for an Automatic Warehousing System. In this connection, in order to control the horizontal travel of the gantry-like conveyor frame 26, each of the outer end posts in each row of the support posts 12 may be provided with a trip member 90 of magnetic material, which in the embodiment illustrated merely comprises a plate-like member extending outwardly from the outer side of each of the outer posts, for controlling the counting of the storage bays and the stopping of each side frame of the conveyor frame as the load carrier moves along the storage area. Proximity switches 92 may be mounted as by means of bracket structure 94 on each conveyor side frame, for controlling the counting and stopping of the movement of the gantry-like conveyor frame. Trips may also be provided for decelerating the speed of the conveyor frame as it moves to the selected aisle in the storage frame. For decelerating purposes trips need be provided on only one side of the conveyor frame for controlling the deceleration of both of motors 42, while trips 90 control the precise stopping of the horizontal movement of the load carrier. Similarly for controlling the vertical travel of the elevator, each vertical track or mast 40 on both side frame components 34 may be provided with individual trips 96 (FIG. 2) disposed along the mast, adapted for coaction with switch means on the elevator, to locate the final stopping position on the elevator at each selected level, while only one of the masts (e.g. the left hand mast in FIG. 2) may be provided with a set of trips 98 for sensing or counting the vertical movement of the elevator. A control console 100 may be provided having suitable control switches and knobs for actuation by the warehousing operator as described in the aforementioned application 418,048, for determining to what location in the storage frame the load carrier will move, to either deposit a load into or retrieve a load from the storage frame, or for moving a load from one position in the storage frame to another position therein. The load carrier might also be remotely controlled, with such control being performed manually, or the load carrier might be controlled by a punch card reader, or by direct connection to a computer, or by some other information source.

The operation of the mechanism may be as follows: An elongated load may be deposited on the pick-up and discharge station by an overhead crane, with such station, as aforedescribed, preferably comprising spaced load support stands 20 disposed inwardly of the side frames of the conveyor frame 26. The load carrier 21 may then be moved to a position adjacent the load, with the elevator 30 of the load carrier disposed in a lowered condition, such as for instance illustrated in FIGURE 1, and with the extractor mechanism 32 on the elevator being disposed in a position whereby upon lateral movement of the extractor toward the load, the extractor will be disposed beneath the load. The elevator may then be energized by means of motors 58 to raise the load as supported on the extractor mechanism off the station supports 20, and then the extractor can be returned with the supported load to its generally centralized orientation on the elevator. Meanwhile, the elevator may be moved vertically upwardly to a level above the height of the storage frame. In this elevated position of the elevator the elevator and associated extractor will be disposed in a generally nested relation between the upper cross members 36 of the gantry conveyor frame as can be seen in FIGURE 3. The load carrier 21 may then move into the storage frame area with the load being supported on the raised elevator above the storage frame, and to the selected aisle in the storage frame, for depositing of the load thereat. The elevator may then be lowered, by means of energization of the motors 58, to the desired level, with the top surfaces of the extractor units 66 being disposed slightly above the top surface of the laterally projecting load support members 16 at the selected level of the selected aisle of the storage frame. The extractor mechanism 32 may then be energized, to cause lateral movement thereof with respect to the elevator thereby moving the load outwardly above the selected level of laterally extending load support members 16, and downward movement of the elevator will then deposit the load on the load support members. The extractor may then be retracted back to its centered position with respect to the elevator, while the load remains on the load support members at the selected level in the storage frame.

To remove a load from the storage frame the elevator is likewise moved to the upper portion of the conveyor frame prior to movement into the storage area. The elevator and associated extractor are lowered into the selected aisle and to a position wherein the top surface of the extractor units 66 are slightly below the under surface of the load as supported on the load support members of the storage frame, and thereafter upon lateral movement of the extractor beneath the load and upward movement of the elevator the load is lifted off the load support members, whereupon the extractor and supported load are moved back to centered position with respect to the elevator. The elevator is then raised out of the aisle to its uppermost position, and the gantry-like load conveyor frame 26 is moved either back to the pick-up and discharge station for depositing the load thereat, or to another position with respect to the storage frame, for depositing the load in such new position.

From the foregoing discussion and accompanying drawings it will be seen that the invention provides a novel load carrier and storage mechanism for handling long loads and in a manner whereby an elevator and associated load handling extractor mechanism of the load carrier is moved to a level disposed above the uppermost level of the storage frame prior to movement of the load carrier into the storage frame area for either depositing a load therein, or removing a load from the storage frame, and in a manner which results in a highly compact warehousing system which can be utilized in a smaller space than heretofore possible, using for instance, stacker crane mechanism.

We claim:

1. In a load transfer and storage mechanism, storage means adapted to receive loads therein, said storage means having travel space thereabove, a movable load carrier for moving loads into and removing loads from said storage means, said load carrier comprising means adapted for straddling said storage means including a gantry-like frame having side sections and a cross section bridging said side sections and coupled thereto, and traction means on said side sections for generally horizontal movement of said frame with respect to said storage means, and in straddled relation relative thereto, an elevator movably mounted on said frame for vertical movement with respect thereto and to a level above the top level of said storage means, and extractor means mounted on said elevator for lateral movement with respect to said elevator for depositing loads into or withdrawing loads from said storage means, power means coacting with said frame for driving the latter in a generally horizontal direction, other power means coacting with said elevator for driving the latter in a generally vertical direction, generally vertically extending track means on said side sections coacting with said elevator for guiding the vertical movement of said elevator relative to said frame, said elevator in its uppermost position being receivable in at least partially overlapping relation with respect to said cross section and at an elevation above the top level of said storage means, and wherein said storage means comprises a plurality of spaced vertically extending storage supports disposed in rows oriented transverse of the direction of movement of said frame with aisles disposed between said rows, said aisles extending lengthwise in the general directions of extension of said cross section, at least certain of said vertically extending supports having vertically spaced generally laterally extending support members projecting in a direction toward the associated aisle and adapted to receive loads thereon, said elevator being adapted to move downwardly into a selected aisle from said uppermost position and to locate said extractor means with respect to said support members for operation of said extractor means to deposit a load into or remove a load from said storage means 2. A mechanism in accordance with claim 1, wherein said cross section comprises laterally spaced elongated cross members connecting said side sections, said cross members being spaced generally horizontally with respect to one another a greater distance than the corresponding width of said elevator whereby said elevator may be raised into nested relation between said cross members and above said storage means upon elevation of said elevator to said uppermost position with respect to said frame.

3. A mechanism in accordance with claim 2, wherein each of said cross members comprises a truss-like framework of substantial vertical dimension attached to said side sections adjacent the upper end portions of said side sections, each of said side sections comprising a vertically oriented framework of a greater width than the width of each of said aisles, and said track means on each side section comprising a vertically extending rail generally centrally located with respect to the respective side section and extending vertically for substantially the full height of the respective side section.

4. A mechanism in accordance with claim 1, wherein said cross section comprises at least one elongated cross frame component pivoted adjacent its ends to said side sections for relative pivotal movement of said cross frame component in a generally horizontal plane and wherein the first mentioned power means comprises electric motors coacting individually with each of said side sections for driving the respective side section in a selected generally horizontal direction and in synchronism with the other motor driven side section.

5. A mechanism in accordance with claim 4 including squaring means for maintaining said side sections in generally aligned condition in horizontal directions.

6. A mechanism in accordance with claim 1 wherein said extractor means comprises a plurality of spaced load supporting units movably mounted on said elevator, each of said units being extensible, and power means operably coupled to said units for actuating the latter in synchronism, for depositing loads into and removing loads from said storage means.

7. A mechanism in accordance with claim 1 wherein said traction means of said gantry-like frame includes wheels rotatably mounted on said gantry-like frame and supporting the latter on spaced rails extending exteriorly of said storage means, and means on said gantry-like frame coacting with said rails for preventing accidental tipping of said gantry-like frame.

8. A mechanism in accordance with claim 1 including control means coacting with the first mentioned power means for controlling the positioning of said gantry-like frame with respect to the aisles of said storage means.

9. A mechanism in accordance with claim 1 including control means coacting with the second mentioned power means for controlling the positioning of said elevator with respect to the selected of said laterally extending support members.

10. In a load transfer and storage mechanism, storage means adapted to receive loads therein, said storage means having travel space thereabove, a movable load carrier for moving loads into and removing loads from said storage means, said load carrier comprising means adapted for straddling said storage means and an elevator movably mounted on said straddling means for vertical movement with respect thereto and extractor means mounted on said elevator for lateral movement with respect to said elevator to deposit loads into and withdraw loads from said storage means, said straddling means comprising a mobile gantry-like frame including transversely spaced side frame components and cross frame components bridging said side frame components with said cross frame components being pivoted to said side frame components for relative pivotal movement of said cross frame components in generally horizontal planes, a power means individually coacting with each of said side frame components for driving the respective side frame component in a selected generally horizontal direction and in synchronism with the other side frame component, said elevator comprising spaced side members and transversely extending cross members connecting said side members and with said cross members being pivoted to said side members for relative movement of said cross members in generally vertical planes, a power means individually coacting with each of said side members for driving the respective side member in a selected generally vertical direction and in synchronism with the other side member of said elevator, and squaring means coacting with said straddling means and with said elevator for maintaining said spaced side frame components in generally transversely aligned condition and for maintaining said spaced side members of said elevator in generally vertically aligned condition.

11. A mechanism in accordance with claim 10, wherein said squaring means comprises a support extending from one of said side frame components in a direction toward the other side frame component, generally horizontally spaced actuators on said support and electrical control means including an actuating portion thereof supported by at least one of said cross frame components and oriented so as to be actuated by one or the other of said actuators upon predetermined misalignment between said side frame components, said control means being in circuit with the first mentioned power means for controlling the energization of the latter.

12. A mechanism in accordance with claim 10, wherein said squaring means comprises a support extending from one of said elevator side members in a direction toward the other side member, generally vertically spaced actuators on said support, and electrical control means including an actuating portion thereof supported by one of said elevator cross members and oriented so as to be actuated by one of the other of said actuators upon predetermined vertical misalignment between said side members, said control means being in circuit with the second mentioned power means for controlling the energization of the latter.

13. A mechanism in accordance with claim 10 wherein said elevator comprises three cross members including a pair of spaced lower cross members and an upper centrally oriented cross member, said extractor means being mounted on said lower cross members.

14. A mechanism in accordance with claim 10 wherein said straddling means includes generally vertical extending track means on said side frame components, and means on said elevator coacting with said track means for guiding the vertical movement of said elevator with respect to said straddling means.

References Cited
UNITED STATES PATENTS

| | | |
|---|---|---|
| 1,198,409 | 9/1916 | Berghoefer 212—13 |
| 3,035,717 | 5/1962 | Stone. |
| 3,263,831 | 8/1966 | Francis. |

FOREIGN PATENTS

| | | |
|---|---|---|
| 78,440 | 6/1962 | France. |

GERALD M. FORLENZA, *Primary Examiner.*

RAYMOND B. JOHNSON, *Assistant Examiner.*

U.S. Cl. X.R.

212—13